July 20, 1937.  T. J-B. LAFITTE  2,087,383
BRAKE
Filed Oct. 22, 1934  2 Sheets-Sheet 1

INVENTOR.
Theodore Jean-Baptiste Lafitte
BY Jerome R. Cox
ATTORNEY.

July 20, 1937.  T. J-B. LAFITTE  2,087,383
BRAKE
Filed Oct. 22, 1934  2 Sheets-Sheet 2
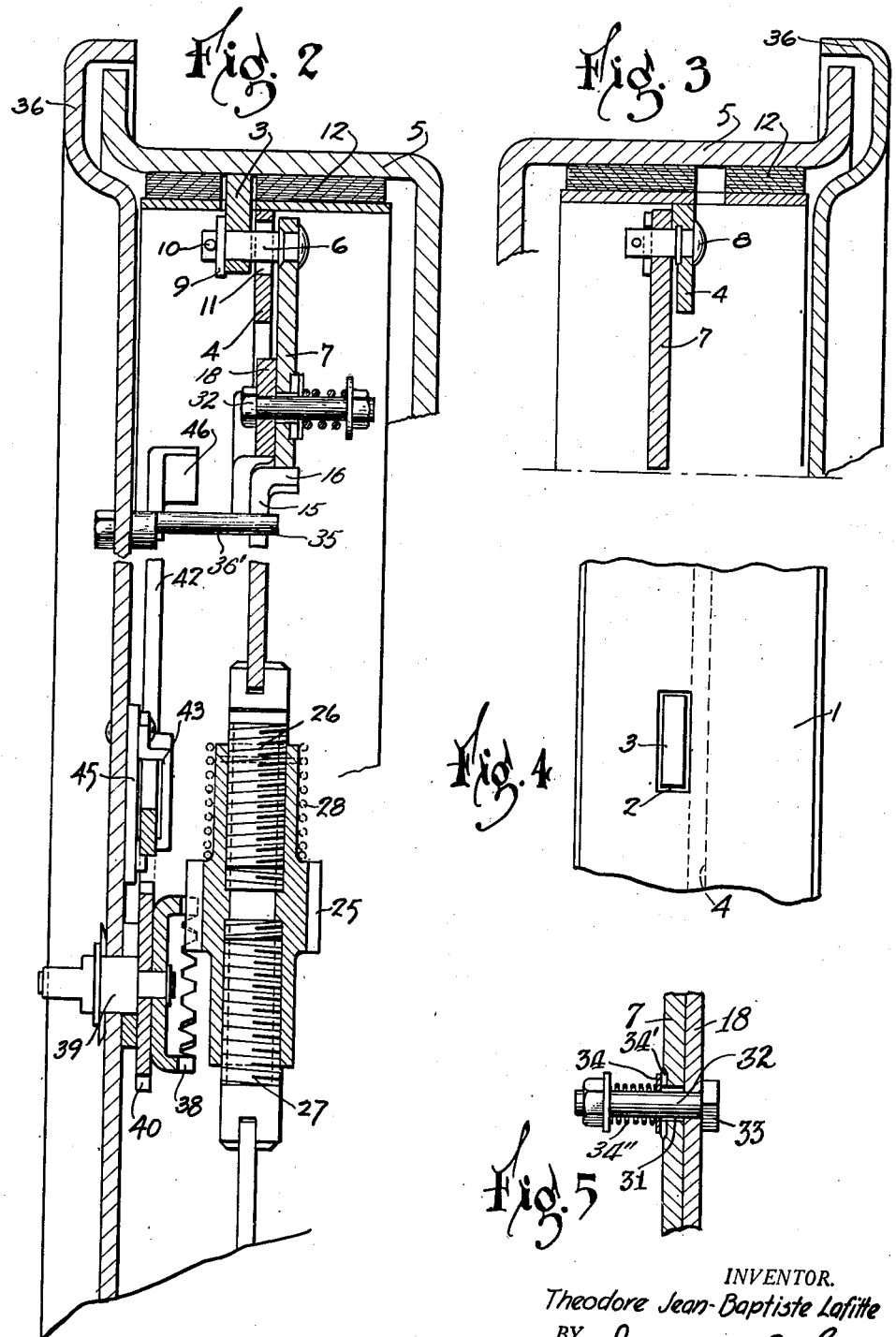
INVENTOR.
Theodore Jean-Baptiste Lafitte
BY Jerome R. Cox
ATTORNEY.

Patented July 20, 1937

2,087,383

UNITED STATES PATENT OFFICE 2,087,383

BRAKE

Theodore Jean-Baptiste Lafitte, Paris, France, assignor to Bendix Products Corporation, South Bend, Ind., a corporation of Indiana Application October 22, 1934, Serial No. 749,349
In France November 15, 1933

6 Claims. (Cl. 188—79.5)

The present invention relates to brakes, and more particularly to devices adapted to take up automatically the wear of brakes.

An object of the present invention is to take up automatically and continuously the slack which exists between the brake shoes and the brake drum, to assure an efficient brake application however worn the friction lining may be.

One of the features of the present invention is that the slack is taken up independently of the drum expansion, so that brake grabbing, which might take place upon the contraction of the drum, is eliminated.

The present invention also assures a suitable centering of the brake shoes, so that in practice a constant clearance is assured between each brake shoe and the brake drum.

Besides, the present invention enables the brake shoes to be adjusted at the will of the driver in case he would himself influence the adjustment of the brake shoes.

The present invention will be understood by anyone skilled in the art by reference to the following description and the annexed drawings, which show a brake known in the trade as "Bendix brake", and in which:

Figure 2 is a section on the line 2—2 of Figure 1;

Figure 3 is a section on the line 3—3 of Figure 1;

Figure 4 is a view of a brake shoe portion showing the push member disclosed in the present invention;

Figure 5 is a fragmentary section on the line 5—5 of Figure 1, and shows a yielding washer adapted to prevent any undesirable displacement of the member, the position of which is controlled by the wear of the lining, said member being shown as being placed below a bracket fixed to the brake shoe.

Figure 1:
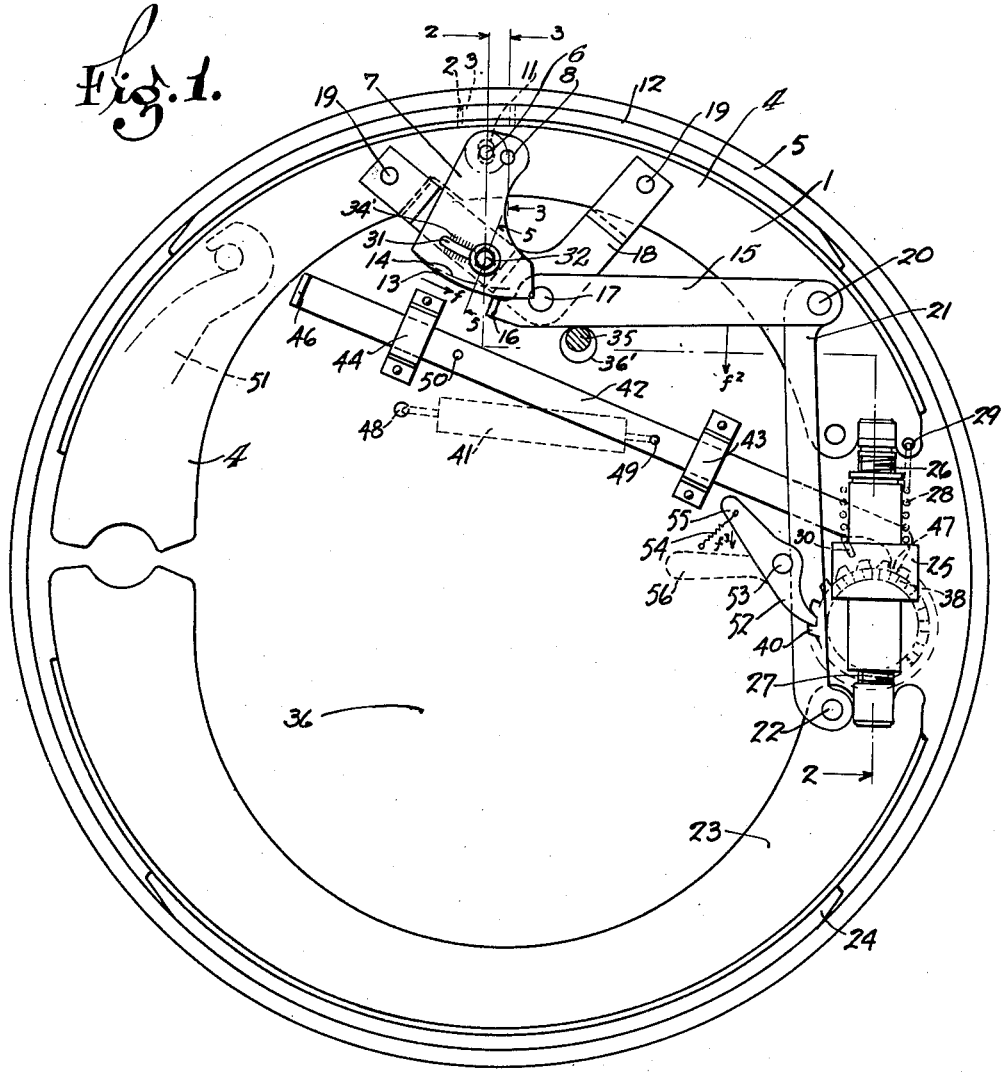
Figure 1 is a view of a brake of the Bendix type in which the slack is taken up according to the present invention.

On the brake shoe 1, preferably in the spot submitted to the maximum wear, is provided a slot 2 which may have a rectangular section and through which freely passes a push member 3 arranged parallel to the web 4 of said brake shoe. The push member 3 has a rounded outer surface so as to fit suitably against the periphery of the drum 5.

Said push member 3 is connected by means of a pin 6 to a sector 7 pivotally mounted on a pin 8 secured on the brake shoe 1. The pin 6 passes through slot 11 provided in the web 4 of the brake shoe 1 and is kept in position by means of a washer 9 and a cotter pin 10. The length of the slot 11 is greater than the diameter of the pin 6, so that when the push member 3 is brought backwards as the friction lining 12 becomes worn, the sector 7 is rotated counter-clockwise as shown by the arrow f.

The sector 7 has a face 13 formed with a suitable curve which may be a spiral of Archimedes, a logarithmic spiral or any other suitable shape to form a cam, the radius of which increases according to the direction of the arrow f. The form of this cam 13 will appear more clearly by comparing it with a portion 14 of a circle concentric with the pin 8 shown in Figure 1. The curve of the cam 13 should preferably be irreversible or approach irreversibility. The end 16 of a lever 15 is provided with a projecting portion in the embodiment shown in the Figure 1 which bears against the cam 13. The lever 15 is pivotally mounted on a pivot 17 secured on an angle bracket 18 suitably secured to the web 4 of the brake shoe 1, by means of rivets 19. The other end of the lever 15 is pivotally connected at 20 to a link 21 which is connected by means of a pivot 22 to the conventional brake shoe 23 of the Bendix type provided with friction lining 24. It is to be noted that the pivot 22 is mounted in a hole which is provided in the conventional brake shoe and which is intended to receive a tension spring connecting the respective brake shoe ends.

According to one embodiment of the invention, the lever 15 is urged against the cam face 13 of the sector 7 owing to the fact that the conventional adjustment device of the Bendix brake, formed by an internally threaded sleeve 25 cooperating with the threaded links 26—27, has a tendency to rotate in order to space the brake shoes 1 and 23 under the torsional action of a spring 28 having one end secured in an opening 29 on the brake shoe 1, while the other end of this spring is secured in a recess 30 on the sleeve 25. The spreading of these brake shoes 1 and 23 is prevented because the end 16 of the lever 15 bears against the irreversible face 13 of the sector 7, the position of this sector being determined as disclosed above by the position of the push member 3.

As the friction lining 12 becomes worn, the push member 3 will be pushed backwards when the brake is applied and the sector 7 will therefore be rotated counter-clockwise, i. e. in the direction of the arrow f, so that the lever 15 will pivot upon the pivot 17 owing to the particular form of the cam 13. Movement of the lever 15 relieves the tension on link 21 tending to hold the ends of the brake shoes together and also relieves the pressure on threaded links 26 and 27. When this pressure is relieved spring 28 rotates the nut 25 to urge links 26 and 27 apart, thus taking up any slack in the system and again forcing the end 16 of lever 15 into engagement with the cam surface 13. In this way the brake shoes are automatically and continuously adjusted to maintain the initial brake shoe clearance.

In order to avoid any undesirable displacement of the sector 7, there is provided a device which can have the following construction: on the sector 7 which in the embodiment of the Figure 5 is mounted beside the bracket 18, is provided a slot 31 through which passes a bolt 32 provided with a head 33. A corrugated washer 34 is urged by means of a spring 34'' against shallow, fine pitch, punched corrugations 34' provided at the border of the slot 31. The position of the corrugations provided on the washer can correspond to the position of the corrugations provided on the sector. The position of the corrugations can also be staggered one with respect to the other for half a pitch in order to obtain a finer adjustment.

As the lining wears the position of the lever 15 will be modified owing to the fact that said lever will pivot upon its pivot 17 in the direction of the arrow $f^2$, so that the center of the brake shoe assembly position could vary with respect to the original center of said assembly. To assure a suitable and automatic centering of the brake shoes 1 and 23, the lever 15 bears against a stop 35 secured on the backing plate 36, so that any displacement of the lever 15 which takes up the slack keeps the original brake shoe centering. It is to be noted that by a suitable choice of the stop 35 and of the leverage of the lever 15, it will be possible to obtain for each shifting of the push member 3 a suitable displacement of the bracket 18 and of the brake shoe 1 to which this bracket is attached, in order to obtain the object above referred to, i. e. the keeping of the original centering.

The stop 35 can be advantageously mounted on an eccentric member 36' fixed to a bolt (not shown) which passes through the backing plate and is fixed thereon in a determined position by means of a nut likewise not shown.

The face of the push member which bears against the drum as the brake is applied will preferably be formed by a substance adapted to wear less than the friction lining, and will be preferably made of aluminum, of a compressed substance, or the like. It is to be noted that even in the event that the push member is made of a substance having the same degree of wear as that of the friction lining, it will wear less since it is not applied to the brake drum with any substantial force.

Figure 6:
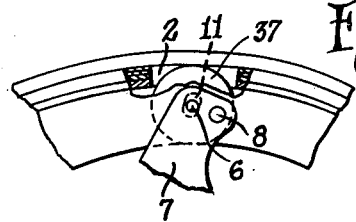
Figure 6 is a partial view showing a modified construction.

Figure 6 shows a modification of the construction of Figure 1 in which member 3 is replaced by a roller 37 rotatably mounted on the pivot 6 and extending through the opening 2 in the brake shoe to engage the drum. This construction operates in the same manner as that of Figure 1 except that the roller 37 rolls instead of sliding on the brake drum, thus minimizing wear.

In the embodiment disclosed above, the irreversible connection between the sector 7 and the lever 15 has been realized by means of a cam of a suitable form and it is understood that any other mechanism adapted to attain this irreversibility or to approach it can be used.

The continuous operation of the automatic adjustment under the action of the spring 28 can also be effected by means of a device forming another embodiment of the present invention and which for convenience sake is shown on the Figure 1. It is obvious that these devices can be used either together or separately.

The threaded sleeve 25, which controls the spreading of the brake shoes, meshes with a toothed wheel 38 fixed to a pivot 39 rotatably mounted on the backing plate 36. The toothed wheel 38 is attached to a ratchet wheel 40 likewise mounted on the pivot 39 and is urged in the direction which produces the spreading of said brake shoes by means of a spring 41 which acts through a pawl rod 42. Said pawl rod 42 is mounted on the backing plate by means of brackets 43—44 which are proportioned to permit lateral motion of the pawl to permit it to escape the teeth of the ratchet. In order to diminish the friction, the pawl rod is guided on the backing plate by means of plates 45. One end of the pawl rod is bent up at 46, while the opposed end 47 forms the pawl proper which meshes with ratchet wheel 40.

One end of the spring 41 is attached to the backing plate 36 at 48, while the other end of this spring is inserted in a hole 49 provided in the pawl rod 42. For simplicity, the spring 41 forms an angle with the pawl so that it urges it, not only in the direction of its length toward the brake control lever 51, but also laterally so that the pawl is kept in engagement with the ratchet wheel.

As the lining becomes worn, the end of the lever 15 pivots on the pivot 17, permitting the ratchet wheel 40 urged by the pawl rod 42 to rotate the threaded sleeve 25 and thus space the brake shoes in order to take up the slack in a continuous manner and keep the original clearance or a similar one.

On the pawl rod 42 is provided a pin 50 intended to engage the bracket 44 when the rod is shifted for a sufficient distance. In normal position, the lever 51 controlling the spreading of the brake shoes does not engage the portion 46 of the pawl rod 42, but as the brake is applied and when owing to the wear of the lining, the pawl rod 42 has moved sufficiently near the control lever, the latter will engage the portion 46 so that the pawl rod 42 will be pushed downwards, tensioning the spring 41. When the brake control lever returns to its inoperative position, the pawl rod 42 remains pushed down against the tension of the spring 41 and is held there by engagement with a tooth of the ratchet wheel 40 until such time as the friction lining wears causing arm 15 to swing on its pivot and thus permitting further expansion of the shoes.

In order to prevent the reverse rotation of the toothed wheel when the pawl rod 42 is operated by the control lever 51, a pawl 52 mounted on a pivot 53 journalled in the backing plate 36 is engaged with the ratchet wheel 40 and is kept in engaged position with this ratchet wheel by means of a spring 54 which acts on the tail 55 provided on said pawl.

It is to be noted that when owing to the expansion of the drum, the clearance between the brake shoes and the brake drum becomes greater the control lever swings further to apply the brake shoes and the pawl rod is moved further, with consequent greater tensioning of the spring 41. It appears from the foregoing, however, that the adjustment members themselves will not be influenced by the drum expansion, so that any brake grabbing which might take place during the subsequent contraction of said drum if proportionate clearance adjustments had been made is eliminated.

According to the present invention, an adjustment can also be effected at the will of the driver. For this purpose, the pawl 52 is disengaged from the ratchet wheel 40 by means of a handle 56 attached to the pivot 53 of the pawl outside of the brake enclosure. When the handle 56 is rotated in the direction opposite that of the arrow $f^3$, the pawl 52 is disengaged from the ratchet wheel 40 and at the same time the tail 55 strikes the pawl rod 42 and disengages it from the ratchet wheel 40. By rotating the pivot 39 to which the toothed wheel 38 is attached, the driver is enabled to adjust the distance between the brake shoe, so that the automatic adjustment realized according to the present invention can be modified according to the will of the driver.

Although certain embodiments of the present invention have been shown and illustrated, it is obvious that they are only given as an example and that other constructions will appear to any man skilled in the art.

I claim:

1. A brake comprising a drum, a pair of shoes positioned in said drum and adapted to be brought into contact therewith for retarding the rotation of said drum, one of said shoes being formed with an opening, an extensible connection between said shoes comprising a pair of oppositely threaded members and a sleeve associated with said members, a spring secured to one of said shoes and to said sleeve and tending to rotate said sleeve in a direction to extend said extensible member, a bracket secured to one of said shoes, a lever pivoted upon said bracket, a link pivotally connected at one end to the other of said shoes and at the other end to said lever, a cam lever pivoted on a shoe which carries the bracket, means secured to the bracket in frictional engagement with said cam lever, and a contact element carried by the cam lever and extending through the opening in the shoe to contact with the drum when the shoe is brought into drum engagement.

2. A brake comprising a pair of brake shoes having friction linings thereon, an adjusting device adapted to expand said shoes comprising a pair of oppositely threaded members and a sleeve associated with said members, spring means urging said device in the direction to expand said shoes, a linkage normally preventing said expansion and holding the shoes in a given position, and means controlled by the wear of said friction lining, arranged to adjust said linkage to permit said spring and said adjusting device to expand said shoes.

3. A brake comprising a pair of brake shoes having friction linings thereon, an adjusting device adapted to expand said shoes comprising a pair of oppositely threaded members and a sleeve associated with said members, spring means urging said device in the direction to expand said shoes, means actuated by brake operation for renewing the energy stored in said spring means, a linkage normally preventing said expansion and holding the shoes in a given position, and means controlled by the wear of said friction lining, arranged to adjust said linkage to permit said spring and said adjusting device to expand said shoes.

4. A brake comprising a pair of brake shoes having friction linings thereon, an adjusting device adapted to expand said shoes comprising a pair of oppositely threaded members and a sleeve associated with said members, spring means urging said device in the direction to expand said shoes, a linkage normally preventing said expansion and holding the shoes in a given position, and means controlled by the wear of said friction lining, arranged to adjust said linkage to permit said spring and said adjusting device to expand said shoes, said means comprising a member mounted on one of the brake shoes and engageable with the brake drum when the shoe is applied.

5. In a brake having a pair of articulated brake shoes, a floating expansible compression link forming the articulation between the shoes, spring means tending to expand said link, a tension link secured between the shoes arranged to counteract the action of the spring, and means mounted on one of the shoes and controlled by the wear of the shoes for modifying the position of said tension link to permit said spring to expand the shoes.

6. In a brake having a pair of articulated brake shoes, a floating expansible compression link forming the articulation between the shoes, spring means tending to expand said link, means actuated by brake operation for renewing the energy stored in said spring means, a tension link secured between the shoes arranged to counteract the action of the spring, and means mounted on one of the shoes and controlled by the wear of the shoes for modifying the position of said tension link to permit said spring to expand the shoes.

THEODORE JEAN-BAPTISTE LAFITTE.